United States Patent
Dietz et al.

(10) Patent No.: US 9,950,494 B2
(45) Date of Patent: Apr. 24, 2018

(54) METHOD AND APPARATUS FOR MANUFACTORING A SANDWICH PART AND SANDWICH PART

(71) Applicant: MAGNA STEYR Fahrzeugtechnik AG & Co KG, Graz (AT)

(72) Inventors: Wolfgang Dietz, Pirching (AT); Danijel Drezga, Ried im Innkreis (AT); Christoph Krammer, Deutschlandsberg (AT); Guenter Wolfsberger, Lieboch (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 140 days.

(21) Appl. No.: 14/978,891

(22) Filed: Dec. 22, 2015

(65) Prior Publication Data
US 2016/0176153 A1 Jun. 23, 2016

(30) Foreign Application Priority Data

Dec. 22, 2014 (EP) ..................... 14199859
Feb. 2, 2015 (EP) ..................... 15153433

(51) Int. Cl.
*B32B 5/02* (2006.01)
*B32B 3/12* (2006.01)
(Continued)

(52) U.S. Cl.
CPC ............... *B32B 5/02* (2013.01); *B29C 35/16* (2013.01); *B29C 45/14* (2013.01); *B29C 51/082* (2013.01); *B29C 51/14* (2013.01); *B29C 67/246* (2013.01); *B29C 70/546* (2013.01); *B29C 71/02* (2013.01); *B29D 7/01* (2013.01); *B29D 99/0021* (2013.01); *B32B 3/12* (2013.01); *B32B 7/12* (2013.01);
(Continued)

(58) Field of Classification Search
CPC .. B32B 5/02; B32B 3/12; B32B 25/04; B32B 2255/02; B32B 2274/00
See application file for complete search history.

(56) References Cited

U.S. PATENT DOCUMENTS

2003/0134085 A1* 7/2003 Haas .................. B32B 5/22
428/116
2007/0008707 A1 4/2007 Franken et al.
(Continued)

FOREIGN PATENT DOCUMENTS

CN 103862764 A 6/2014
DE 102005049640 A1 4/2007
(Continued)

OTHER PUBLICATIONS

Prepelka et al. (Journal of Cellular Plastics, Mar./Apr. 1975, 87-98).*
(Continued)

*Primary Examiner* — Liam J Heincer
(74) *Attorney, Agent, or Firm* — Jordan IP Law, LLC; Todd A. Vaughn

(57) ABSTRACT

A method for producing a sandwich component, which method permits the production of a sandwich component with a class-A surface without cumbersome reworking of the visible surface of the sandwich component, a sandwich component produced by the method, and a corresponding device for producing the sandwich component.

19 Claims, 3 Drawing Sheets

(51) Int. Cl.
| | |
|---|---|
| *B32B 7/12* | (2006.01) |
| *B32B 37/10* | (2006.01) |
| *B32B 37/14* | (2006.01) |
| *B29C 70/54* | (2006.01) |
| *B29C 45/14* | (2006.01) |
| *B29D 7/01* | (2006.01) |
| *B29C 67/24* | (2006.01) |
| *B29C 51/08* | (2006.01) |
| *B29C 51/14* | (2006.01) |
| *B29C 71/02* | (2006.01) |
| *B29C 35/16* | (2006.01) |
| *B29D 99/00* | (2010.01) |
| *B32B 37/12* | (2006.01) |
| *B32B 38/00* | (2006.01) |
| *B29L 7/00* | (2006.01) |
| *B29C 51/44* | (2006.01) |
| *B29L 31/60* | (2006.01) |
| *B29K 75/00* | (2006.01) |

(52) U.S. Cl.
CPC ............ *B32B 37/10* (2013.01); *B32B 37/146* (2013.01); *B29C 51/445* (2013.01); *B29C 2791/001* (2013.01); *B29C 2793/0009* (2013.01); *B29K 2075/00* (2013.01); *B29K 2995/0022* (2013.01); *B29L 2007/002* (2013.01); *B29L 2031/608* (2013.01); *B32B 37/1284* (2013.01); *B32B 38/0012* (2013.01); *B32B 2250/40* (2013.01); *B32B 2309/04* (2013.01); *B32B 2309/12* (2013.01)

(56) References Cited

U.S. PATENT DOCUMENTS

| | | | |
|---|---|---|---|
| 2008/0018586 A1 | 8/2008 | Kamano et al. | |
| 2010/0028609 A1 | 2/2010 | Sato et al. | |
| 2010/0136285 A1* | 6/2010 | Poeltl | B32B 27/40 428/116 |
| 2010/0140984 A1* | 6/2010 | Murray | B60J 7/022 296/216.01 |
| 2011/0014480 A1* | 1/2011 | Fader | B29C 70/086 428/423.1 |
| 2011/0101731 A1 | 5/2011 | Legler et al. | |
| 2011/0226312 A1 | 9/2011 | Bohm et al. | |
| 2011/0262703 A1* | 10/2011 | Legler | B29C 70/086 428/156 |
| 2013/0136931 A1* | 5/2013 | James | B29C 67/246 428/423.1 |
| 2014/0272349 A1* | 9/2014 | Di Sante | B32B 5/24 428/213 |
| 2016/0016521 A1* | 1/2016 | Maehara | B60R 13/011 428/138 |

FOREIGN PATENT DOCUMENTS

| | | |
|---|---|---|
| DE | 102007062758 A1 | 9/2008 |
| EP | 2275307 A1 | 1/2011 |
| JP | H02155913 A | 6/1990 |
| JP | 2004230999 A | 8/2004 |
| JP | 2007083550 A | 4/2007 |
| JP | 2011528296 A | 11/2011 |
| JP | 2011530444 A | 12/2011 |
| WO | 2006038670 A | 4/2006 |
| WO | 2012/015583 A1 | 2/2012 |

OTHER PUBLICATIONS

McCalla et al., Plastics, Rubber and Composites, 2007, vol. 36(1), 26-33 (Year: 2007).*

Office Action for Japanese Patent Application No. 2015-248723, dated Oct. 18, 2016, 8 pages including 4 pages of English translation.

Osborne Industries, Inc, "Reaction Injection Molding FAQ", retrieved from Internet Archive Wayback Machines, Dec. 6, 2013, 2 pages, http://web.archive.org/web/20131206190741/http://www.osborneindustries.com/reaction-injection-molding-faq.php.

Hennecke GmbH & Co. KG, "Definitely lightweight! Production of fibre composite bonnets", Oct. 18, 2013, 1 page, http://www.hennecke.com/en/news/definitely-lightweight-production-fibre-composite-bonnets.

Gunther Heisskanaltechnik, "Vakuum Lösungen für Spritzgußwerkzeuge", May 14, 2016, retrieved from http://www.weschu.de/unternehmen/fachtag_vakuum_cumsa.pdf.

* cited by examiner

METHOD AND APPARATUS FOR MANUFACTORING A SANDWICH PART AND SANDWICH PART

CROSS-REFERENCE TO RELATED APPLICATIONS

The present application claims priority 35 U.S.C. § 119 to European Patent Publication Nos. EP14199859.1 (filed on Dec. 22, 2014) and EP15153433.6 (filed on Feb. 2, 2015), which are each hereby incorporated by reference in their complete, respective entireties.

TECHNICAL FIELD

Embodiments relate to a method for producing a sandwich component, a device for producing a sandwich component, and a sandwich component.

BACKGROUND

Sandwich components are typically areal components which are constructed from at least three plies, specifically a central core ply between two cover layers or plies, and are used for example in the automobile construction industry as body components, in particular for the construction of lightweight automobiles. Normally, areal sandwich components are produced, the shape of which can be adapted in a compression mould.

German Patent Publication No. DE 10 2010 0054 56 A1 discloses, for example, a sandwich component comprising a honeycomb core with a plurality of webs and with at least one cover layer, wherein the honeycomb core is composed of a cellulose-based material, in particular paper, wherein the cover layer is formed from a fibre-reinforced semi-finished part with a thermoplastic synthetic matrix, wherein the webs of the honeycomb core are, at attachment points to the cover layer, at least partially received in the thermoplastic synthetic matrix of the cover layer, such that a bond of the sandwich component is realized.

German Patent Publication No. DE 10 2012 006 609 A1 disclose a sandwich component having two fibre-reinforced thermoplastic cover layers and an interposed honeycomb core ply, wherein the cover layers are connected to the honeycomb core ply via a thermoplastic material, and wherein at least one side of the sandwich component has a decorative ply which is arranged on the cover layer, wherein the sandwich component furthermore comprises at least one foamed ply which is arranged between the cover layer and the decorative ply, wherein the foamed ply is connected to the cover layer and to the decorative ply. Via this solution, it is sought to realize a laminated sandwich component which is intended to prevent surface defects on the decorative layer arising as a result of the support core that is used.

SUMMARY

Embodiments relate to a method for producing a sandwich component, which method permits the production of a sandwich component with a class-A surface without cumbersome reworking of the visible surface of the sandwich component, a sandwich component produced by the method, and a corresponding device for producing the sandwich component.

Embodiments relate to a sandwich component which is easy to produce and which has a class-A surface.

In accordance with embodiments, a method for producing a sandwich component, comprising: lining or encapsulating a honeycomb core having a plurality of webs on both sides with at least one ply of a fibrous material, said plies forming cover plies to form a pack; impregnating, wetting or spraying the pack composed of honeycomb core and fibrous plies with a matrix; compressing and hardening the pack in a compression moulding tool to form a component; and applying a class-A surface at least on a visible side of the component as an RIM layer in a Reaction Injection Moulding (RIM) process, in particular in a Vacuum Reaction Injection Moulding (V-RIM) process.

In accordance with embodiments, a "class-A surface" is to be understood to mean that unevennesses, in particular undulations, on the surface of the component owing to the face-side edges of the honeycomb core are eliminated to such an extent that painting of the component without subsequent removal of such unevennesses is possible, that is to say the surface exhibits sufficiently high continuity of curvature, that is to say is sufficiently smooth, that it can be used as a visible surface for example of an automobile body. Aside from any surface activation and subsequent painting processes, therefore, no reworking in the conventional sense, for the described elimination of undulations, is necessary.

In accordance with embodiments, a device which is configured for carrying out the method set forth herein may include an RIM tool which is heatable, in particular, zonally heatable, such that different zones, areas, or regions of the sandwich component may be heated at different intensities.

In accordance with embodiments, a sandwich component comprises a honeycomb core having a plurality of webs, the honeycomb core being lined or encapsulated on both sides with at least one ply of a fibrous material, said plies forming cover plies, wherein the fibrous plies are impregnated, wetted or sprayed with a matrix, wherein the component is compression-moulded, and wherein at least a visible side of the component has a paintable class-A surface applied thereto in a Reaction Injection Moulding process.

In accordance with embodiments, the method for producing a fibre composite sandwich component comprises a honeycomb core with a plurality of webs is lined or encapsulated on both sides, in particular, on the top and on the bottom, with at least one ply of a fibrous material, such as, for example, a fibrous semi-finished part, as cover layers or cover plies. Here, the fibrous material may already comprise a matrix.

Subsequently, the pack ("composite package") composed of honeycomb core and cover plies is impregnated, wetted and/or sprayed with a matrix, such as, for example, polyurethane (PUR), in a CSM spraying process. The matrix or matrix material may be composed of thermoplastic or thermosetting plastics.

Subsequently, the pack with the matrix applied thereto is placed in a compression-moulding tool, such as, for example, a heated compression-moulding tool, and is compressed in accordance with the required component geometry and hardened.

Subsequently, it is optionally possible, while the component is left in the compression-moulding tool, for a "contour cut," that is to say, coarse cutting to shape, to be performed around the tool or around the tool geometry.

Subsequently, it is optionally possible, if necessary, for the component to be cooled or thermally stabilized in the compression-moulding tool or outside the compression-moulding tool, preferably cooled or thermally stabilized in a further tool, in particular, in a workpiece cooling device.

In accordance with embodiments, "thermally stabilized" is to be understood to mean that the component assumes a temperature below the previous conversion temperature in order to attain a stable state. Here, the cooling in a workpiece cooling device makes it possible to realize the shortest production time, in particular with regard to continuous production of only one component.

Optionally, tempering of the component, that is to say a temperature process, in order for component distortions to be compensated and/or the level of cross-linking of the materials to be increased, is performed in a further tool or in a further device. For example, it may be provided that, for cooling, the component is merely placed on a frame or by way of one side on a surface. Use may however also be made of a closed cooling device which surrounds the component around the full circumference and in which the temperature can be regulated. Further cooling of the component may optionally be performed.

This may be followed by trimming of the outer contour, or cutting to shape of the side regions/edges, in accordance with the required component contour, and optionally also a chip-removing machining process, such as, for example, milling of the outer contour and milling and drilling for inserts and other similar recesses in the component.

In accordance with embodiments, the paintable class-A surface (surface lining or RIM layer) is applied to the visible side and/or around the outer edges, in a V-RIM (vacuum-RIM) process in a further tool. It is achieved in this way that no disturbing undulation, such as is otherwise conventional, remains on the surface of the component. Further tempering may optionally be performed at this location.

Optionally, preparation of the surfaces thus produced into a state ready for painting may be performed by way of surface activation in a final finishing process.

Optionally, inserts may subsequently be inserted into the component.

The component may subsequently be painted.

In accordance with embodiments, the honeycomb core, or the honeycomb core lined or encapsulated with the cover layers, may be held via clamping frames such that it can be rotated and turned in order that it can be easily sprayed with or wetted with a matrix material.

In accordance with embodiments, the honeycomb core may be of reinforced design at required locations, for example, for reinforcement in what will subsequently be a hinge-mounting region, in order to realize different compression hardnesses, for example, for pedestrian protection, and desired levels of stability.

In accordance with embodiments, the matrix structure may be discontinuous or, depending on component requirements, may partially vary; in particular, it is possible for short-fibre material (glass, carbon, textile fibres etc.) to additionally be applied in zones, areas, or regions, such that, in accordance with component requirements, partially varying characteristics of the component are realized in different zones, areas, or regions extending over the surface of the component.

In accordance with embodiments, the matrix construction of the sandwich component may have the effect that an adhesive connection is produced between honeycomb core and cover plies.

In accordance with embodiments, the compression moulding may be performed while the pack, or the matrix situated on the cover layers, is still wet.

In accordance with embodiments, the application of the paintable class-A surface may be performed by injection of matrix filler material, preferably PUR, at pressures below 20 bar and/or with the aid of a vacuum in a region situated opposite the injection region in a closed and/or heated and/or zonally heated tool. A zonally heated tool makes it possible both that the matrix applied to the cover layers can be of varying thickness, and that it is not necessary to always use the same number or similar honeycomb cores layered one on top of the other over the surface of the component.

In accordance with embodiments, it is possible, for example, for two to three honeycomb cores to be layered one on top of the other in a central region of the component, and for only one or two honeycomb cores to be layered one on top of the other in an edge region, in order to be able to individually adapt the component to respective functional requirements, for example, to optimum pedestrian protection or head impact protection. Therefore, in the component, depending on thickness or varying construction, there may be a varying heat requirement for the application of the class-A surface, and thus, a zonally heated tool may be necessary.

In accordance with embodiments, the matrix may be forced into a gap between the sandwich component and RIM tool by way of at least one punctiform and/or at least one areal injection nozzle. The flow front or the matrix flow may be particularly drawn in by way of a vacuum applied in certain specific zones, areas, or regions at the opposite side at one or more points or in regions. In this way, unbroken, continuous gap filling extending over a large zone, area, or region is made possible.

In accordance with embodiments, in contrast to conventional, very thin application of RIM layers, in particular, of less than 0.01 mm, which results in premature solidification of the matrix, it may be the case in the method that an additional vacuum is used, and thus, a significantly thicker RIM layer, that is to say matrix layer, of approximately 0.2-2 mm is produced, and it is thus ensured that the material does not prematurely solidify, and a uniform layer is formed.

In accordance with embodiments, the at least one punctiform and/or at least one areal injection nozzle, that is to say the sprue, may be situated firstly between the two tools or tool halves and secondly in the edge region of the sandwich component, in order that flow passes uniformly around the component on the bottom side and on the top side.

In accordance with embodiments, a ventilation and/or vacuum device may be additionally provided in the tool in order for the air to be extracted from the tool during the injection process and to keep the injection pressure as low as possible.

In accordance with embodiments, on the non-visible side of the component, there may be arranged a seal which prevents the RIM layer from spreading over the non-visible side, preferably the underside of the component, and which separates the two separate vacuum regions from one another. The shape of the end of the RIM layer is determined by the shaping of the seal. Via the shaping of the seal, it may be possible to realize, for example, a continuous transition between the top side of the RIM layer and cover layer.

In accordance with embodiments, the class-A surface material, that is to say the RIM layer, should seal the trimmed edges of the component, at the side regions and/or edge regions of the component and/or the face sides of the honeycomb core. It may be the case that the two cover layers are connected, that is to say closed off, at the lateral ends of the sandwich component via the RIM layer.

In accordance with embodiments, the fibre composite sandwich component can, during the V-RIM surface application, be held by way of a vacuum clamping system, in particular, held in the lower part of the receptacle.

In accordance with embodiments, after the V-RIM surface application, the surface of the component may be excessively smooth, such that, in order for paint to adhere, the surface must be roughened again or activated in a final finishing process, for example by way of grinding, a plasma process or chemically.

In accordance with embodiments, the fibre composite sandwich component may be positioned via a fibre composite reference point system during the RIM surface application.

In accordance with embodiments, the matrix material of the cover layers and of the RIM layer may be a thermosetting plastic, preferably PUR, wherein the cover layers and the RIM layer do not need to use the same matrix material, in particular, do not need to use the same PUR material.

DRAWINGS

Embodiments will be illustrated by way of example in the drawings and explained in the description below.

DESCRIPTION

Figure 1:
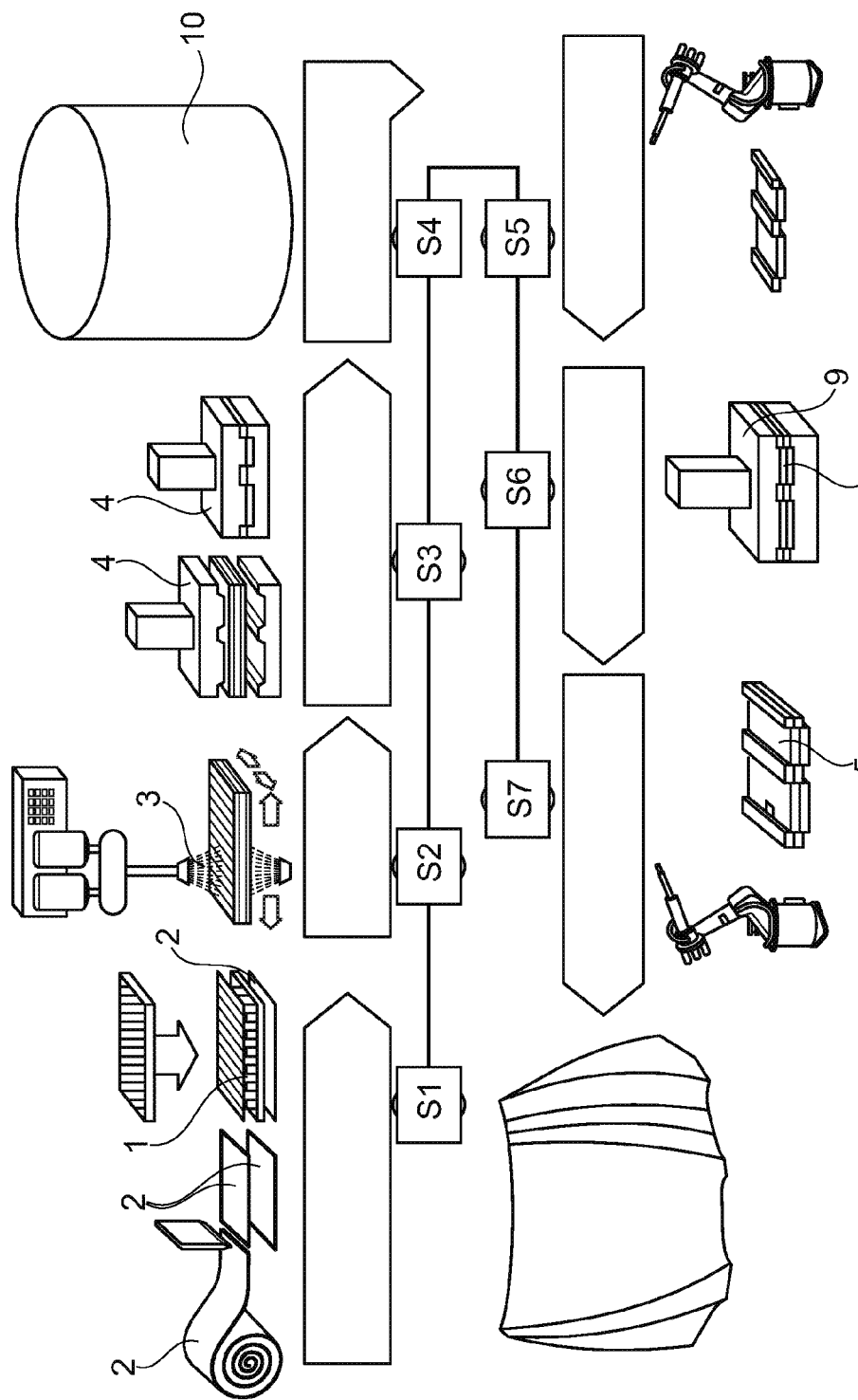
FIG. 1 illustrates a method for producing a sandwich component, in accordance with embodiments.

FIG. 1 illustrates method blocks S1 to S7, some of which are optional, in a method for producing a sandwich component, in accordance with embodiments.

In accordance with embodiments, in method block S1, a method for producing a fibre composite sandwich component comprises forming a composite package or pack by lining up or encapsulating, on the top and on the bottom, a honeycomb core 1 having a plurality of webs, with at least one ply of a fibrous material 2, for example, of a fibrous semi-finished part, as cover layers or cover plies.

The cores or honeycomb cores 1 may be paper cores or cardboard cores, or are composed of other cellulose-based materials. The honeycomb cores 1 may also be cores composed of plastic, such as polyurethane (PU), polypropylene (PP) and the like, or from metal, wood or foamed material. The honeycomb cores may have webs in a honeycomb arrangement or in an undulating arrangement. The webs may, however, also form circular, triangular, rectangular, square, trapezoidal or polygonal cells, wherein these need not involve regularly repeating shapes (within a honeycomb core).

In method block S2, subsequently, the pack or composite package composed of honeycomb core 1 and cover plies 2 is impregnated, wetted and/or sprayed with a matrix 3, such as, for example, PUR, in a CSM spraying process.

In method block S3, subsequently, the pack that has had the matrix 3 applied to it is placed into a compression-moulding tool 4, such as, for example, a heated compression-moulding tool, and is compressed in accordance with the required component geometry and hardened.

In accordance with embodiments, it is optionally possible, while the component is left in the tool, for a "contour cut," that is to say, coarse cutting to shape, to be performed around the tool or around the tool geometry.

In method block S4, subsequently, it is optionally possible, if necessary, for the component to be cooled in the compression-moulding tool 4 or outside the compression-moulding tool, in particular, cooled or thermally stabilized in a further tool, for example, in a workpiece cooling device 10.

In accordance with embodiments, optionally, tempering of the component, that is to say, a temperature process over a relatively long period of time, in order for component distortions to be compensated and/or the level of cross-linking of the materials to be increased, may be performed in a further tool or in a further device. Further cooling of the component is optionally also performed.

In method block S5, this may be followed by trimming of the outer contour, or cutting to shape of the side regions/edges, in accordance with the required component contour, and optionally also a chip-removing machining process, such as, for example, milling of the outer contour and milling and drilling for inserts and other similar recesses in the component.

In method block S6, a paintable class-A surface is applied, that is to say, a surface is applied as an RIM layer 5 to the visible side and/or around the outer edges in a V-RIM process, that is to say, with the use of a vacuum for drawing in the introduced matrix 3, in an RIM tool 9. It is achieved in this way that no disturbing undulation, shrinkage or pores, such as are otherwise conventional, remain(s) on the visible surface of the component. Further tempering may optionally be performed at this location.

In method block S7, optionally, preparation of the surfaces thus produced into a state ready for painting may be performed by way of surface activation in a final finishing process. Optionally, inserts may be inserted into the component.

In the Vacuum Reaction Injection Moulding (V-RIM) process, a liquid PUR material is injected under pressure and with the application of a vacuum at the side situated opposite the flow front in a gap generated between the surface of the sandwich component and the surface of the RIM tool 9. See, FIG. 2. Here, the polyurethane lining material reacts under the action of temperature (heated tool) and hardens in the tool gap. This gives rise to the component quality in a manner dependent on the tool surface. After the final contour machining process (removal of sprue and protruding edges, grinding of surface), the component is ready to be painted.

For the production of a fibre composite visible component, such as, for example, an engine hood, with a class-A surface straight from the tool and manufactured in a PUR wet pressing process, it may be the case that a paper honeycomb core 1 is encapsulated on the top and on the bottom with at least one layer 2 of fibrous material or fibrous semifinished part material composed for example of wovens, scrims, knitted fabrics, mats, meshes and nonwovens composed of glass fibre and/or carbon fibre and/or textile materials and/or ceramic fibres and/or natural fibres and/or plastics fibres.

To attain the different compression hardnesses and stability, for example, in the hinge region, the honeycomb core 1 may be of reinforced design at the required points. Subsequently, the application of the polyurethane matrix 3 is performed in the PUR-CSM spraying process.

During this process of application by spraying, the fibrous semi-finished parts 2 are wetted on both sides with a thermally activatable PUR system which, applied with an optimum layer thickness, produces a connection between the core 1 and cover plies 2. Here, targeted matrix application is also possible in all component regions with the addition of short-fibre materials such as glass fibre, carbon fibre, or textile fibres. In the subsequent process step, the component is compressed within a heated mould 4 in accordance with its required component geometry and is hardened.

The trimming of the outer contour is performed as a subsequent step before the paintable class-A surface (RIM layer 5) is applied to the visible side and around the outer edges of the component in the V-RIM process and is prepared into a state ready for painting in a final finishing process (surface activation). The V-RIM process is highly advantageous owing to the component size of visible components, for example in the case of engine hoods in the automobile industry, in relation to the layer thickness (gap between sandwich component and RIM tool 9 between 0.2-2.0 mm).

In accordance with embodiments, the PUR-RIM matrix 3 is not only forced into the gap between sandwich component and RIM tool 9 by way of punctiform and/or areal injection nozzles 6, but the flow front is drawn in by way of a vacuum 7 applied at the opposite side at one or more points or over an area, thus permitting unbroken gap filling in a reliable manner in terms of a process. It is sought to optimize the ratio of the component surface area to layer thickness in the context of the component geometry, wherein the minimized component overall weight is the decisive influential factor.

Conventional gap filling systems have the disadvantage that, beyond ratios of surface areas to layer thickness of less than 0.01, the solidification of the flow front occurs before the gap filling process is complete. Even PUR systems with conventional hardening delay are not capable of ensuring the required open time while simultaneously meeting the requirements with regard to the class-A surface quality straight from the tool—said systems have an increased tendency for bubble formation in the climate change test owing to an activator.

During the V-RIM surface application, the sandwich component itself is held in the lower part of the receptacle by way of a vacuum clamping system and/or by way of an areally applied vacuum 8 and positioned by way of a fibre composite RPS system. Here, the vacuum 7 is separated from the vacuum 8, for example, by a seal 14, such that the different vacuum pressures required for performing the respective different functions, for example, the drawing-in of the matrix or holding the sandwich component in position on the receptacle or on the tool, can be set.

In order, in the case of sandwich components which exhibit relatively low compressive strength with resistance to damage, to realize a class-A surface and sealing of the trimmed edges, it is necessary to perform surface application by injection of matrix filler material at pressures below 20 bar and/or with the aid of a vacuum in a region situated opposite the injection region in a closed and/or heated/zonally heated tool. See, FIG. 2.

Said surface material, for example, polyurethane and/or other flowable surface materials for plastics surfaces, is hardened in a temperature range between 40° C. and 170° C. in a temperature-controlled tool. Through targeted control of the parameters of matrix material mixing ratio, viscosity and tool temperature, it is possible to attain hardening times of less than 5 minutes. To make the hardening process more homogeneous and to be able to introduce heat in a controlled fashion, the tool is divided into temperature zones, areas, or regions. The temperature zones must be temperature-controlled, that is to say heated and/or cooled, independently of one another and in accordance with the component geometry. Furthermore, an additional tempering process may be integrated after the hardening/cooling and after the V-RIM application in order to increase the temperature stability of the component, in particular for inline and online paint resistance. This tempering process may be performed at up to 210° C. and may last a maximum of 60 minutes, either in a heated tool, a furnace or in a conveyor furnace.

To realize a durable, exacting surface, the surface layer must be no thinner than 0.2 mm and no thicker than 2.0 mm. For better setting of the surface thickness, the tool may be configured by way of positive mould technology.

In the edge region, the surface material fills the gap between the trimmed (also milled, lasered, punched or similarly prefabricated) structural component and the tool surface. In this case, the thickness of the surface layer may be significantly greater, and may even amount to a few millimeters, See, FIGS. 2 and 3.

The component is placed into and positioned in the tool by hand or in automated fashion, and specifically, may be centred by way of the component form or via an RPS system, and held on the opposite component surface via vacuum suction and/or via closing and fixing aids.

The tool has one or more punctiform sprues or a fan sprue in order to distribute the surface material in bubble-free fashion over the component surface and in accordance with the selected layer thickness. Furthermore, in the tool, there is provided a ventilation or vacuum device in order to enable the air to be extracted from the tool during the injection process and to be able to keep the injection pressure as low as possible. The position of the sprue and/or of the ventilation means is dependent on the component shape and on the tool and the selected plant concept (tilting and pivoting tool).

Immediately before the gap filling between tool and component comes to an end (depending on the tool or the component shape to be filled), the ventilation and/or vacuum device are closed in order to ensure the reliable and bubble-free surface and edge filling. The point in time is dependent on multiple parameters, such as temperature of the tool, component and/or matrix, duration of the filling process, fill volume (parameterized) and fill pressure.

After the hardening process, the tool is opened and the component is removed. Depending on component size and shape, ejectors may be integrated in the tool, which ensure damage-free and easy removal.

Any burrs on the component resulting from the tool parting plane may subsequently be cut off or ground off manually or by machine. The component is ready for the further process steps (preparation for painting).

In accordance with embodiments, the entire process may take place within a cycle time of 280 seconds, wherein the application of the surface layer (RIM layer 5) to realize the class-A surface may be performed only in that region of the component which will later be visible, and around component edges. The sealing of the edges serves for sealing off the component and for improving the haptic impression. The V-RIM process may be performed as a process step in parallel with the sandwich production.

A suitable PUR material that can be processed in the V-RIM process and which ensures the demanded surface quality is available, for example, from the company Rühl Puromer GmbH.

A sandwich component in accordance with embodiments may also be utilized for functional integration, and may in particular perform an antenna function, illumination function, energy storage function, or air supply and guidance function in the engine bay. Further functional integration may also be realized with regard to visual effects such as direct and indirect illumination, which on the one hand may be implemented as a safety function or on the other hand may be used as a design-emphasizing element for highlighting contours and structures on the vehicle.

Figure 3:
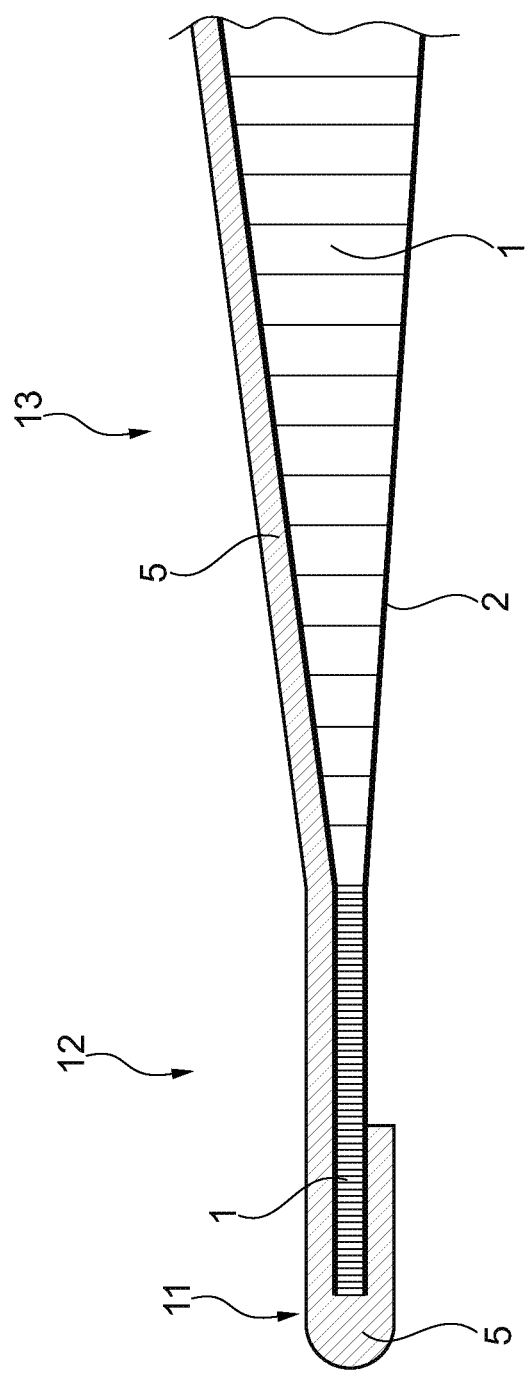
FIG. 3 illustrates a sandwich component, in accordance with embodiments.

FIG. 3 illustrates a finished, crushed sandwich component in accordance with embodiments. The component comprises a honeycomb core 1 and cover layers 2. The cells of the honeycomb core 1 have been crushed or compression-moulded with particularly great intensity in particular in a first zone 12, and in a second zone 13 have been compressed to a lesser extent and form a profile toward the first zone 12. The component furthermore has an RIM layer 5 and an edge seal as an RIM layer 5 on the face side 11 of the component.

Figure 2:
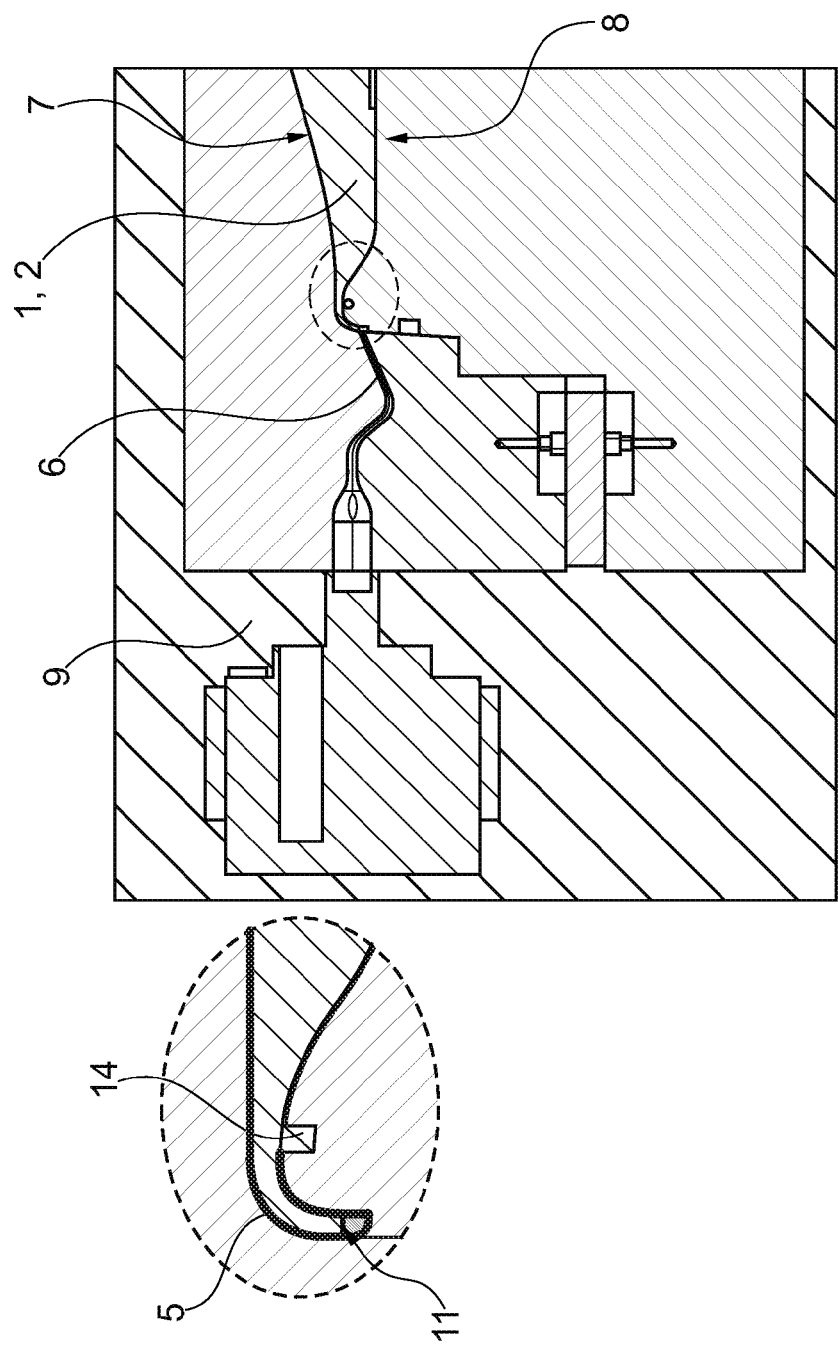
FIG. 2 illustrates a device for carrying out the method for producing a sandwich component, specifically an RIM tool (right), and a detail view thereof (left), in accordance with embodiments.

In accordance with embodiments, the shape of the end of the RIM layer 5 can be defined by way of a seal 14 (illustrated in FIG. 2). For example, in the case of a square cross section of the seal 14, a corresponding transition of the RIM layer 5 is produced on the underside of the sandwich component, here, the shaping of the tool is self-evidently also decisive. Via other seal shapes of the seal 14 and/or other tool forms, a different profile or tapering-out of the RIM layer 5 and/or a different transition of the RIM layer 5 to the cover layer 2 would be possible.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second, etc. are used herein only to facilitate discussion, and carry no particular temporal or chronological significance unless otherwise indicated.

This written description uses examples to disclose the invention, including the preferred embodiments, and also to enable any person skilled in the art to practice the invention, including making and using any devices or systems and performing any incorporated methods. The patentable scope of embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, may be mixed and matched by one of ordinary skill in the art to construct additional embodiments and techniques in accordance with principles of this application.

LIST OF REFERENCE SIGNS

1 Honeycomb core
2 Fibrous ply
3 Matrix
4 Compression moulding tool
5 RIM (Reaction Injection Moulding) layer
6 Punctiform and/or areal injection nozzle
7 First vacuum
8 Second vacuum
9 RIM tool
10 Workpiece cooling device
11 Face side
12 First zone
13 Second zone
14 Seal

What is claimed is:

1. A method for producing a sandwich component for a motor vehicle, the method comprising:

forming a pack by lining or encapsulating a honeycomb core having a plurality of webs on both sides with at least one ply of a fibrous material, said at least one ply forming cover plies;

impregnating, wetting or spraying the pack with a matrix;

forming the sandwich component by compressing and hardening the pack to form a plurality of zones having different numbers of honeycomb cores layered one on top of another;

applying, at least on a visible side of the sandwich component, a class-A surface applied thereto as Reaction Injection Moulding (RIM) layer using an RIM tool divided into different temperature zones to correspond to the varying thickness of the motor vehicle component, wherein applying the RIM layer is performed by concurrently injecting a matrix in an injection region at one side of the sandwich component while also applying a vacuum in a vacuum region of the sandwich component situated opposite the injection region.

2. The method of claim 1, wherein applying the RIM layer comprises applying the RIM layer in zones of the sandwich component.

3. The method of claim 1, wherein the RIM layer has a thickness of 0.2-2 mm.

4. The method of claim 1, wherein the impregnating, wetting or spraying is performed in a composite spray molding (CSM) spraying process.

5. The method of claim 1, wherein the matrix comprises a polyurethane resin systems (PUR) matrix.

6. The method of claim 1, further comprising, after the compressing and hardening, cooling and/or thermally stabilizing the sandwich component.

7. The method of claim 1, further comprising, after the compressing and hardening, tempering the sandwich component.

8. The method of claim 1, further comprising, after the compressing and hardening, coarse cutting the sandwich component in order to shape the sandwich component.

9. The method of claim 1, further comprising, before applying the RIM layer, trimming an outer contour of the sandwich component, and/or milling and/or drilling the sandwich component.

10. The method of claim 1, further comprising, after applying the RIM layer, activating a surface of the sandwich component, and/or painting the sandwich component.

11. The method of claim 1, further comprising controlling the temperature of each temperature zone of the RIM tool independently of one another and in accordance with the thickness of the motor vehicle component.

12. A method for producing a motor vehicle component, the method comprising:

impregnating, wetting or spraying a pack with a matrix material, the pack including a honeycomb core and a ply of fibrous material as a cover layer on a top side and a bottom side of the honeycomb core;

forming, in response to the impregnating, wetting or spraying, the motor vehicle component by compressing and hardening the pack to have different zones having different numbers of honeycomb cores layered one on top of another, the motor vehicle component thereby having varying thicknesses; and applying, using an RIM tool divided into different temperature zones to correspond to the varying thickness of the motor vehicle component, a class-A surface as Reaction Injection Moulding (RIM) layer on at least a visible side of the motor vehicle component by concurrently injecting an RIM matrix in an injection region at one side of the motor vehicle component, while also applying a first vacuum at a first vacuum region of the motor vehicle component situated opposite the injection region to gap fill the motor vehicle component using the RIM matrix, and while also applying a second vacuum in a second vacuum region of the motor vehicle component to clamp the motor vehicle component in position.

13. The method of claim 12, further comprising separating the first vacuum region from the second vacuum region by providing a seal on a non-visible side of the motor vehicle component.

14. The method of claim 12, further comprising forming a continuous transition between a top side of the RIM layer and the cover layer by providing a seal on a non-visible side of the motor vehicle component.

15. The method of claim 12, further comprising controlling the temperature of each temperature zone of the RIM tool independently of one another and in accordance with the thickness of the motor vehicle component.

16. A method for producing a motor vehicle component, the method comprising:
   forming, by compressing and hardening a pack impregnated with a matrix material, the motor vehicle component to have a plurality of zones of varying thickness, the pack including a honeycomb core and a ply of material as a cover layer on a top side and a bottom side of the honeycomb core; and
   applying, using an RIM tool divided into different temperature zones to correspond to the varying thickness of the motor vehicle component, a class-A surface as Reaction Injection Moulding (RIM) layer on at least a visible side of the component by concurrently injecting an RIM matrix in an injection region at one side of the component, while also applying a first vacuum at a first vacuum region of the component situated opposite the injection region to gap fill the component using the RIM matrix, and while also applying a second vacuum in a second vacuum region of the component to clamp the component in position.

17. The method of claim 16, further comprising separating the first vacuum region from the second vacuum region by providing a seal on a non-visible side of the motor vehicle component.

18. The method of claim 16, further comprising forming a continuous transition between a top side of the RIM layer and the cover layer by providing a seal on a non-visible side of the motor vehicle component.

19. The method of claim 16, further comprising controlling the temperature of each temperature zone of the RIM tool independently of one another and in accordance with the thickness of the motor vehicle component.

* * * * *